May 26, 1925.

A. OMAND

BLOW-OUT PATCH FOR PNEUMATIC TIRES

Filed May 5, 1924

1,539,325

Alexander Omand
by his Attorney
J. F. Belfry

Patented May 26, 1925.

1,539,325

UNITED STATES PATENT OFFICE.

ALEXANDER OMAND, OF TORONTO, ONTARIO, CANADA, ASSIGNOR OF ONE-HALF TO RALPH C. LAMBERT, OF TORONTO, CANADA.

BLOW-OUT PATCH FOR PNEUMATIC TIRES.

Application filed May 5, 1924. Serial No. 711,171.

*To all whom it may concern:*

Be it known that I, ALEXANDER OMAND, a British subject, and resident of the city of Toronto, in the county of York and Province of Ontario, Dominion of Canada, have invented certain new and useful Improvements in Blow-Out Patches for Pneumatic Tires; and I hereby declare that the following is a full, clear, and exact description of the same.

My invention relates to blow out patches for pneumatic tires.

The disadvantages found in the present type of blow out patches in use are—

1. That they do not remove any of the pressure of the inner tube from the weakened portion of the outer casing.

2. That owing to road friction they do not retain their position.

The objects of my present invention are to overcome the foregoing disadvantages and to that end my invention consists broadly of a blow out patch adapted to encircle the inner tube and means for locking the overlaping sides together.

For a further understanding of my invention reference may be had to the accompanying drawings in which,—

Like characters of reference refer to like parts throughout the specifications and drawings.

The blow out patch "A" may be made of any suitable material such as fabric, rubber, leather and the like. The width of the patch "A" is considerably greater than the circumference of the inner tube "B" which allows the free edges "$A^1$" and "$A^2$" to overlap. On opposite sides of the patch "A" are parallel beads "$C^1$" and "$C^2$" spaced from each other a distance equal to the width of the bead so that when the sides are overlapped the beads on one side will enter the space between the beads on the other side and form a locking engagement as shown in Figure 2.

Figure 1:
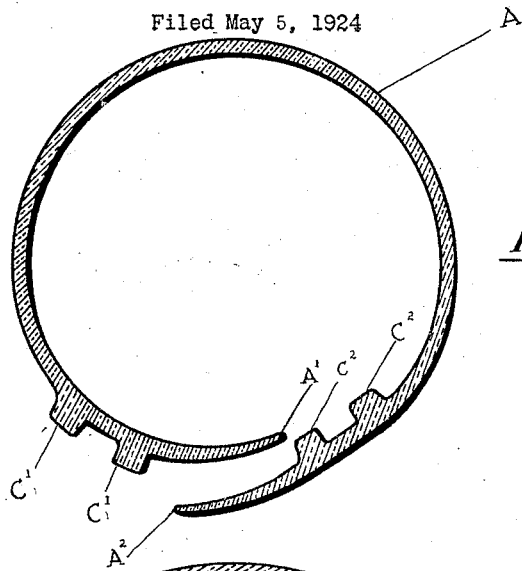
Figure 1 is a cross section of the blow out patch in unlocked position.
Figure 2:
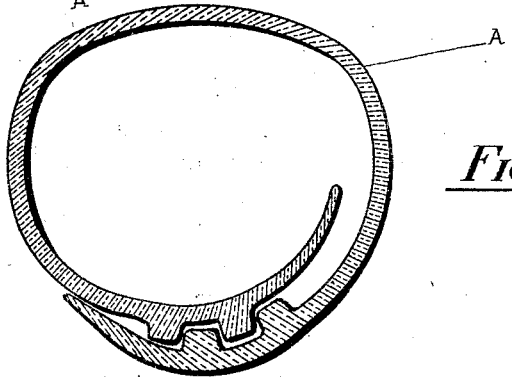
Figure 2 is a cross section similar to Figure 1 showing the patch locked.
Figure 3:
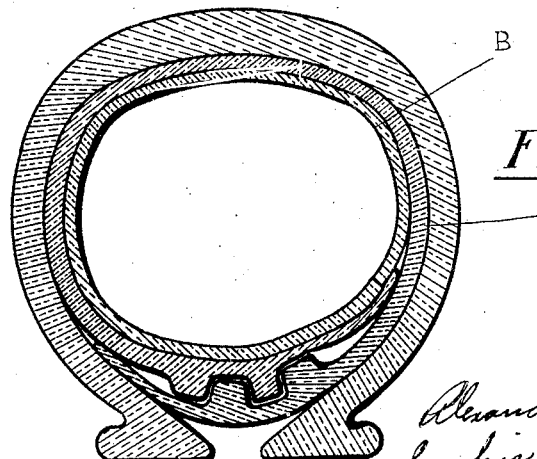
Figure 3 is a cross section showing the outer casing the inner tube and the patch in locked position ready for use.

When in use as shown in Figure 3 the patch "A" encircles the inner tube "B" the beads "C" interlocking as shown in Figures 2 and 3, the air pressure within the inner tube exerting a binding force which prevents any movement of the patch. In addition the air pressure within the inner tube is evenly distributed throughout the surface of the patch and is removed from the weakened or damaged portion of the outer casing.

Having now particularly described and ascertained the nature of my said invention and in what manner the same is to be performed I declare that what I claim is new and desire to secure by Letters Patent is,—

A blow out patch having overlapping sides adapted to encircle the inner tube, said sides being provided with parallel beads for interlocking engagement with each other.

Dated at the said city of Toronto, this 30th day of April, 1924.

ALEXANDER OMAND.

Witnesses:
 IDA E. LAKE,
 STANLEY RICH.